March 14, 1967   E. J. BUTLER, JR   3,309,475
SWITCH CONSTRUCTION FOR USE WITH SAFETY BELTS
Filed Oct. 20, 1964
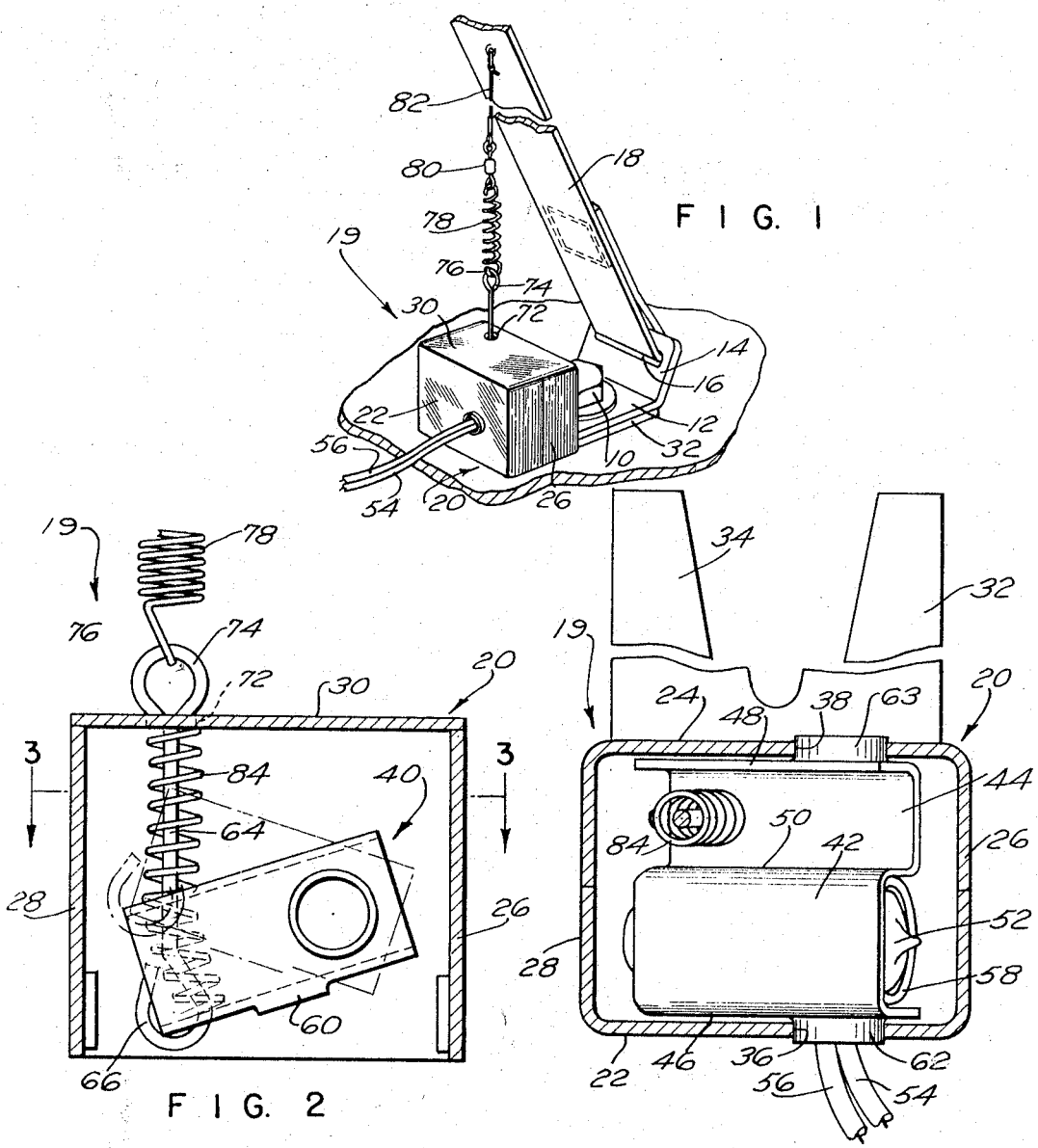
INVENTOR.
EDWARD J. BUTLER, JR.
BY
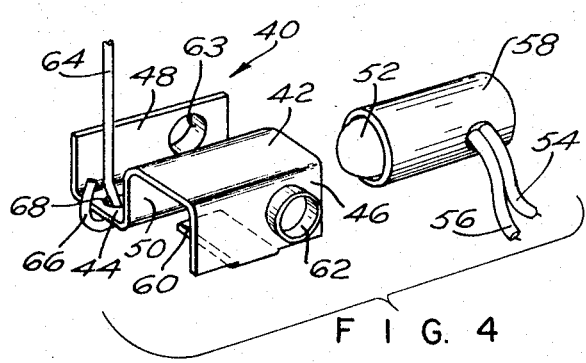
ATTORNEYS

United States Patent Office 3,309,475
Patented Mar. 14, 1967

3,309,475
SWITCH CONSTRUCTION FOR USE WITH SAFETY BELTS
Edward J. Butler, Jr., Barrington, R.I., assignor to Electronics Research Corp., Providence, R.I., a corporation of Rhode Island
Filed Oct. 20, 1964, Ser. No. 405,173
4 Claims. (Cl. 200—61.58)

The present invention relates to a switch construction for use with safety belts. More particularly the present invention relates to a switch construction for use with an automobile safety belt and that is operative to electrically connect the ignition switch of the automobile in the ignition system thereof only if the seat belt is fastened around the driver-occupant of the automobile.

In recent years the installation of safety belts in automobiles has become commonplace. It is understood that the purpose of the safety belt as employed in automobiles, is to reduce personal injury resulting from collisions or sudden stops. However, even though many automobiles have seat belts installed therein, the occupant, on many occasions will fail to fasten the belt in position. As a result the purpose of the seat belt is defeated, and it often time occurs that the occupant of an automobile will be seriously injured in a collision despite the fact that a seat belt had been installed in the automobile and was available for use.

In the pending application, Ser. No. 279,974, now U.S. Pat. No. 3,154,167 entitled, Automobile Safety Belt With Ignition Interlock, one form of a safety belt switch construction is illustrated that requires the fastening of the seat belt around the driver-occupant of the automobile in order that the automobile may be placed in operation. Thus, as described in the foregoing pending application, unless the driver-occupant of the automobile in which the safety switch is installed fastens his seat belt in position, the ignition switch cannot be placed in circuit with the ignition system, and the automobile will not start. The present invention defines an improvement over the switch construction illustrated in the pending application, and provides a simple, yet effective construction that is easy to install and economical to manufacture. The switch construction of the present invention is also electrically connected in circuit to the ignition switch of the automobile in which it is installed, and is operative to place the ignition switch in circuit with the ignition system only when the seat belt to which it is operatively connected is fastened in position around the driver-occupant of the automobile. The switch construction embodied herein is adapted to be secured to a fixed support in the automobile, such as a seat belt anchor bolt and includes a unique carriage assembly that is pivotally mounted within a housing, and that carries an enclosed contact element therewith. The contact element is of the type that includes an electrical conducting fluid therein and upon pivotal movement thereof will establish electrical communication between terminals joined thereto. Thus upon pivotal movement of the carriage assembly in response to tensioning of the seat belt around the driver-occupant of the automobile, the contact element will be moved to the operative position thereof for establishing electrical communication to the ignition switch of the automobile. Closing of the ignition switch will then complete the circuit in the ignition system for starting the car. The switch construction of the invention embodied herein further includes a unique interconnecting member for joining the pivotal carriage assembly to the seat belt.

Accordingly, it is an object of the present invention to provide a switch construction for use with an automobile safety belt that is operable upon the fastening of the belt around the driver-occupant of the automobile to close the circuit to the automobile ignition switch, thereby enabling the automobile to be started.

Another object of the invention is to provide a safety belt for use in an automobile that is interconnected to a switch construction, the switch construction being located in circuit with the ignition of the automobile, and being operative to connect the ignition switch of the automobile in the ignition circuit only when the safety belt is firmly engaged around the driver-occupant of the automobile.

Another object is to provide a safety belt switch that is connectable to a fixed support in an automobile, and that includes a contact element that is normally open and that is closed only when the safety belt is tensioned around the occupant associated therewith.

Still another object is to provide a switch construction for use with an automobile safety belt that is adapted to electrically interconnect the ignition switch of the automobile in the ignition circuit thereof, and that includes a pivotally mounted carriage assembly in which a mercury switch capsule is located, the pivotally mounted carriage assembly being movable in response to tensioning of the safety belt around the occupant associated therewith, wherein the mercury switch places the ignition switch of the automobile in circuit with the ignition system thereof.

Still another object is to provide a unique device for interconnecting a safety switch for use with an automobile safety belt with a portion of the belt, so that tensioning of the belt will produce an operative movement of the switch.

Other objects, features and advantages of the invention will become apparent as the description thereof proceeds when considered in connection with the accompanying illustrative drawings.

In the drawings which illustrate the best mode presently contemplated for carrying out the present invention:

FIG. 1 is a perspective view of the switch construction embodied herein showing the interconnection thereof to a portion of a safety belt that is secured to a fixed support in an automobile;

FIG. 2 is a sectional view of the switch construction illustrated in FIG. 1;

FIG. 3 is a sectional view taken along lines 3—3 in FIG. 2; and

FIG. 4 is an exploded perspective view of the carriage assembly that is pivotally mounted in the housing of the switch construction and that includes a contact capsule therein.

Although not illustrated in detail in the drawing of the present invention, an automobile safety belt of conventional construction is adapted to be secured to supports that are fixed in an automobile and that are normally located on the frame or floor board thereof. Referring to FIG. 1, an anchor bolt 10 which defines a fixed support is located in a conventional manner as is now associated with seat belts of presently constructed automobiles. Secured to the fixed support or anchor bolt 10 is an anchor strap 12 that includes an inclined upwardly extending portion 14 in which a slot 16 is formed. A belt portion 18 of the safety belt extends through the slot 16 and is fixed to the upwardly extending portion 14 of the anchor strap 12. A similar flexible belt portion is fixed to an oppositely located support and cooperates with the belt portion 18 through a buckle assembly for securement around an occupant of the seat with which the safety belt is associated.

Referring now to FIGS. 1-4, the switch construction embodied in the present invention is generally indicated as 19 and includes a housing generally indicated at 20 that may be formed of any suitable material but is preferably stamped from metal and folded to define the construction as illustrated. The switch housing 20 includes side walls 22 and 24, end walls 26 and 28 and a top wall 30. Formed integrally with the side wall 22 and extending outwardly therefrom at the bottom most edge thereof is a mounting plate 32. The mounting plate 32, as seen in FIG. 3, is formed with a V-shaped slot 34 that is adapted to receive the mounting bolt or fixed support 10 when the housing 20 is mounted in position.

Formed in the side walls 22 and 24 of the housing 20 are openings 36 and 38 respectively. The openings 36 and 38 are adapted to receive bearing supports, to be described, of a pivotal carriage assembly generally indicated at 40 that is mounted for pivotal movement within the switch housing 20. As shown more particularly in FIG. 4, the carriage assembly 40 is formed in a one piece construction and is preferably fabricated of a metal material that is stamped and then bent to the required configuration. It is understood, of course, that other materials such as plastic may be employed without departing from the spirit of the invention. The carriage assembly 40 is defined by a body portion that has a generally S-shaped configuration when seen in cross section and that is defined by displaced parallel walls 42 and 44, spaced end walls 46 and 48 and an intermediate wall 50 joined to the walls 42 and 44 in perpendicular relation with respect thereto. The spaced walls 46, and 50 and the wall 42 define a socket that is adapted to receive a cylindrically shaped contact element or capsule 52. The capsule 52 is conventional in construction and contains mercury therein that is adapted to bridge the space between spaced terminals that are electrically connected to leads 54 and 56. As shown in FIG. 4 the leads 54 and 56 extend outwardly of the capsule 52 and are interconnected in the ignition circuit of the automobile. A rubber jacket 58 surrounds the mercury capsule 52 and provides a shield therefor when the capsule is placed in the socket of the carriage assembly 40. A tab 60 that is joined to the body portion 42 is bent over the open portion of the socket after the jacketed capsule 52 is placed therein, and thereby locks the capsule 52 in position within the socket.

The opposite walls 46 and 48 of the carriage assembly body portion are formed with projecting bearing portions 62 and 63 respectively that are formed out of the metal produced by punching out the walls 46 and 48. The bearing portions 62 and 63 project through the openings 36 and 38, respectively, that are formed in the side walls 22 and 24 of the housing 20. The carriage assembly 40 is thus mounted for pivotal movement within the switch housing 20 by means of the engagement of the bearing portions 62 and 63 within the openings 36 and 38 respectively. It will be further seen that the leads 54 and 56 project through the opening formed in the bearing portion 62 and thus are conveniently withdrawn from the housing 20 for interconnection in the ignition circuit. The principal objective of the switch construction 19 is to place the ignition switch of the automobile in circuit with the ignition system thereof upon fastening of the seat belt around the occupant of the seat with which the seat belt is associated. Thus upon pivotal movement of the carriage assembly 40, the mercury capsule 46 will be tilted to establish electrical communication between the terminals therein, thereby placing the ignition switch of the automobile in circuit with the ignition system thereof. In order to operatively connect the carriage assembly 40 to the seat belt portion 18, an interconnecting pin 64 is provided that includes an inner bent end 66 that projects through an opening 68 that is formed in the wall 44 of the switch body portion. The connecting pin 64 projects upwardly with respect to the carriage assembly 40 and extends through an opening 72 that is formed in the top wall 30 of the switch housing 20. An outer end loop 74 is formed on the connecting pin 64 and joined thereto is one end 76 of a coil spring 78. As shown in FIG. 1, the other end of the coil spring 78 is fixed to a coupling 80 that interconnects the spring 78 to a wire 82 that is, in turn, fixed to the belt portion 18.

Referring again to FIG. 2, a coil spring 84 is shown located in surrounding relation with respect to the connecting pin 64, and is disposed between the inner surface of the top wall 30 of the switch housing 20 and the opposing surface of the wall 44 of the carriage assembly 40. The coil spring 84 is adapted to be compressed upon upward movement of the connecting pin 64 which carries the carriage assembly 40 therewith and thus the coil spring 84 normally retains the carriage assembly 40 in the position illustrated in full lines in FIG. 2. In this position the mercury capsule 52 is located such that there is no electrical communication between the terminals thereof. Upon upward movement of the connecting pin 64 carrying the carriage assembly 40 therewith, the mercury capsule will be tilted with the carriage assembly 40 to the position illustrated in dotted lines in FIG. 2. In this position electrical communication is established between the terminals of the capsule. It is understood that the coil spring 84 will tend to return the carriage assembly 40 and the mercury capsule 52 to the normal or open position thereof as shown in full lines in FIG. 2.

In operation of the device, it is first assumed that the terminals of the capsule 52 that are connected to leads 54 and 56 are located in circuit with the ignition system of the automobile in which the switch construction 20 is installed. Therefore, the ignition switch of the automobile will not function to complete a circuit through the ignition system until electrical communication is established between the leads 54 and 56. This electrical communication is established when the driver-occupant of the automobile fastens the safety belt in position therearound. Fastening of the safety belt causes the belt portion 18 to be tensioned in the usual manner. When the belt portion 18 is tensioned, the connecting pin 64 through the interconnection of the spring 78, coupling 80 and wire 82 is moved upwardly, thereby pivoting the carriage assembly 40. As the carriage assembly 40 is pivoted to the position illustrated in dotted lines in FIG. 2, the mercury capsule 52 that is fixed to the carriage assembly 40 is moved therewith, thereby causing the mercury fluid contained within the mercury capsule 46 to bridge the space between the capsule terminals and to establish electrical communication therebetween. It is seen that the automobile may be started only if the seat belt of the driver-occupant is fixed in position therearound, thereby causing the switch construction 19 to be moved to the closed position thereof.

It is seen that the spring 78 that interconnects the connecting pin 64 to the belt portion 18 is provided for absorbing shocks that may be experienced during normal operation of the vehicle. Thus slight movement of the belt portion 18 during normal operation of the vehicle will not produce an undue load on the connecting pin 64 and the carriage assembly 40 interconnected thereto. As illustrated in the drawing and described herein, the switch construction 19 is connected to the anchor bolt 10 that is fixed within the vehicle. However, it is understood that the switch construction 19 may be joined to other fixed supports if it is so required. As further illustrated in FIGS. 1 and 3, and described above, the terminal leads 48 and 50 that are adapted to be interconnected in the ignition system of the vehicle extend through the bearing portion 62 and the opening 36 that is formed in the side wall 22 of the switch housing 20. This arrangement provides for a simple yet effective manner of extending the terminal leads outwardly of the switch housing in the manner as required.

While there is shown and described herein certain specific structure embodying the invention, it will be manifest to those skilled in the art that various modifications and rearrangements of the parts may be made without departing from the spirit and scope of the underlying inventive concept, and that the same is not limited to the particular forms herein shown and described, except, insofar as indicated by the scope of the appended claims.

I claim:
1. In a safety device for use in an automotive vehicle and adapted to be electrically interconnected in the ignition circuit thereof, a safety belt for attachment around an occupant of said vehicle including a pair of flexible portions that are adapted to be interlocked around said occupant, one of said flexible portions being interconnected to a fixed support in said vehicle, a safety switch assembly mounted in said vehicle adjacent to said one flexible portion and including a housing having a pivotally mounted member mounted therein to which a contact element is secured, said contact element being defined by an enclosed cylinder to which terminals are connected, the terminals being interconnected in said ignition circuit, the circuit between said terminals being open when the member in which said contact element is mounted is located in an inoperative position and being closed when said contact element is moved with said member to an operative position, means for interconnecting said member to said one flexible belt portion, and means for retaining said member in the inoperative position when said flexible belt portions are unlocked, said member being responsive to locking of said flexible belt portions together for pivoting against the action of said retainer means and for moving said contact element to the operative position thereof, thereby completing the circuit through said terminals, said pivotally mounted member including a socket portion in which said contact element is received, bearings joined to said member on opposite sides thereof and extending through openings formed in opposite walls of said housing for mounting said member in pivotal relation therein.

2. In a safety device as set forth in claim 1, at least one of said bearings having an opening therethrough which provides for communication through said housing, electrical leads joined to said terminals and extending through the opening for electrical interconnection to the ignition circuit of said vehicle.

3. In a safety device for use in an automotive vehicle and adapted to be electrically interconnected in the ignition circuit thereof, a safety belt for attachment around an occupant of said vehicle including a pair of flexible portions that are adapted to be interlocked around said occupant, one of said flexible portions being interconnected to a fixed support in said vehicle, a safety switch assembly mounted in said vehicle adjacent to said one flexible portion and including a housing having a pivotally mounted member in the inoperative position when said flexible belt secured, said contact element being defined by an enclosed cylinder to which terminals are connected, the terminals being interconnected in said ignition circuit, the circuit between said terminals being open when the member in which said contact element is mounted is located in an inoperative position and being closed when said contact element is moved with said member to an operative position, means for interconnecting said member to said one flexible belt portion, and means for retaining said member in the inoperative position when said flexible belt portions are unlocked, said member being responsive to locking of said flexible belt portions together for pivoting against the action of said retainer means and for moving said contact element to the operative position thereof, thereby completing the circuit through said terminals, said interconnecting means including a pin that is connected to said member and that extends through an opening formed in a wall of said housing, said interconnecting means further including means connected to the outer end of said pin and to said one-belt portion, wherein said member is responsive to tensioning of said belt portion around said occupant for pivotally moving said member and the contact element secured thereto, said retaining means including a tension spring that surrounds said pin and is interposed between said element and the inner surface of the wall through which the pin projects.

4. In a safety device for use in an automotive vehicle and adapted to be electrically interconnected in the ignition circuit thereof, a safety belt for attachment around an occupant of said vehicle including a pair of flexible portions that are adapted to be interlocked around said occupant, one of said flexible portions being interconnected to a fixed support in said vehicle, a safety switch assembly mounted in said vehicle adjacent to said one flexible portion and including a housing having a pivotally mounted member mounted therein to which a contact element is secured, said contact element being defined by an enclosed cylinder to which terminals are connected, the terminals being interconnected in said ignition circuit, the circuit being said terminals being open when the member in which said contact element is mounted is located in an inoperative position and being closed when said contact element is moved with said member to an operative position, means for interconnecting said member to said one flexible belt portion, and means for retaining said member in the inoperative position when said flexible belt portions are unlocked, said member being responsive to locking of said flexible belt portions together for pivoting against the action of said retaining means and for moving said contact element to the operative position thereof, thereby completing the circuit through said terminals, said interconnecting means including an elongated member that extends through said housing and is operatively interconnected to said one-belt portion, said retaining means including a spring member that is interposed between said pivotally mounted member and said one-belt portion and providing resistance to movement of said one-belt portion to the interlocked position around said occupant, and further providing for return of the pivotally mounted member and contact element secured thereto to the inoperative position when the belt portions are released from around the occupant.

References Cited by the Examiner
UNITED STATES PATENTS

| 2,577,909 | 12/1951 | Nielsen | 200—61.18 |
| 2,650,274 | 8/1953 | McCammant | 200—61.47 |
| 2,868,309 | 1/1959 | Burgess | 180—82 |
| 3,154,167 | 10/1964 | Butler et al. | 180—82 |
| 3,185,246 | 5/1965 | Maurer | 180—82 |

BERNARD A. GILHEANY, *Primary Examiner.*

J. BAKER, *Assistant Examiner.*